(12) United States Patent
Fiorillo

(10) Patent No.: US 8,112,372 B2
(45) Date of Patent: Feb. 7, 2012

(54) PREDICTION BY SINGLE NEURONS AND NETWORKS

(75) Inventor: Christopher Fiorillo, Menlo Park, CA (US)

(73) Assignee: Christopher D. Fiorello

(*) Notice: Subject to any disclaimer, the term of this patent is extended or adjusted under 35 U.S.C. 154(b) by 687 days.

(21) Appl. No.: 12/271,282

(22) Filed: Nov. 14, 2008

(65) Prior Publication Data

US 2009/0132451 A1 May 21, 2009

Related U.S. Application Data

(60) Provisional application No. 60/989,391, filed on Nov. 20, 2007.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |

(52) U.S. Cl. .......................................................... 706/21
(58) Field of Classification Search ........................ None
See application file for complete search history.

(56) References Cited

U.S. PATENT DOCUMENTS

| | | | |
|---|---|---|---|
| 5,355,435 A | 10/1994 | Deyong et al. | |
| 5,706,402 A | 1/1998 | Bell | |
| 5,809,490 A * | 9/1998 | Guiver et al. | 706/16 |
| 6,366,897 B1 | 4/2002 | Means et al. | |
| 6,456,989 B1 * | 9/2002 | Kawamura et al. | 706/2 |
| 7,401,058 B2 | 7/2008 | Michel et al. | |
| 7,412,426 B2 | 8/2008 | Hercus | |
| 7,412,428 B2 | 8/2008 | Nugent | |
| 2008/0162391 A1 | 7/2008 | Izhikevich | |

FOREIGN PATENT DOCUMENTS

| | | |
|---|---|---|
| EP | 1650672 | 4/2002 |
| WO | WO 98/57245 | 12/1998 |

OTHER PUBLICATIONS

Friston, "A theory of cortical responses", Philosophical Transactions of The Royal Society, R. Soc. B 29, 2005, pp. 22.*
Foldiak, "Forming sparse representations by local anti-Hebbian learning" Biol. Cybern. 64, 1990, pp. 165-170.*
Uosaki, "A Hybrid Neural Network for Principal Component Analysis", 1993, JCNN, pp. 2500-2503.*
Barlow, et al.; "Adaptation and Decorrelation in the Cortex." 1989; The Computing Neuron, pp. 54-72, Wokingham, England, Addison-Wesley.

(Continued)

*Primary Examiner* — Jeffrey A Gaffin
*Assistant Examiner* — Li-Wu Chang

(57) ABSTRACT

An artificial neuron integrates current and prior information, each of which predicts the state of a part of the world. The neuron's output corresponds to the discrepancy between the two predictions, or prediction error. Inputs contributing prior information are selected in order to minimize the error, which can occur through an anti-Hebbian-type plasticity rule. Current information sources are selected to maximize errors, which can occur through a Hebbian-type rule. This insures that the neuron receives new information from its external world that is not redundant with the prior information that the neuron already possesses. By learning on its own to make predictions, a neuron or network of these neurons acquires information necessary to generate intelligent and advantageous outputs.

19 Claims, 11 Drawing Sheets

OTHER PUBLICATIONS

Bell, et al.; "Storage of a sensory pattern by anti-hebbian synaptic plasticity in an electric fish"; 1993; Proc. Nat'l. Academy of Sciences, USA vol. 90, pp. 4650-4654.

Bienenstock, et al.; "Theory for the Development of Neuron Selectivity: Orientation and Binocular Specificity in Visual Cortex"; 1982; J. Neurosciences, vol. 2, pp. 32-48.

Fiorillo, C.D.; "Towards a General Theory of Neural Computation Based on Prediction by Single Neurons"; Oct. 2008; PLoS ONE, e3298, Issue 10, vol. 3, 12 pages.

Fiorillo, et al.; "Evidence that the delay-period activity of dopamine neurons corresponds to reward uncertainty rather than backpropagating TD errors"; Jun. 15, 2005; BioMed Central, Behavioral and Brain Functions, vol. 1, No. 7, pp. 1-5.

Tobler, et al.; "Adaptive Coding of Reward Value by Dopamine Neurons"; Mar. 11, 2005; Science; vol. 307, pp. 1642-1645.

Destexhe, et al.; "Plasticity in single neuron and circuit computations"; Oct. 2004; Nature, vol. 431, pp. 789-795.

Hosoya, et al.; "Dynamic predictive coding by the retina"; 2005; Nature, vol. 436, pp. 71-77.

Palmieri, et al.; "Anti-Hebbian learning in topologically constrained linear networks: a tutorial"; 1993; IEEE Trans Neural Networks, vol. 4, pp. 748-761.

Srinivasan, et al.; "Predictive coding: a fresh view of inhibition in the retina"; 1982; Proc. Roy Soc Long B, vol. 126, pp. 427-459.

Foldiak, P.; "Forming sparse representations by local anti-Hebbian learning"; Jul. 1990; Biological Cybernetics, Springer-Verlag.

* cited by examiner

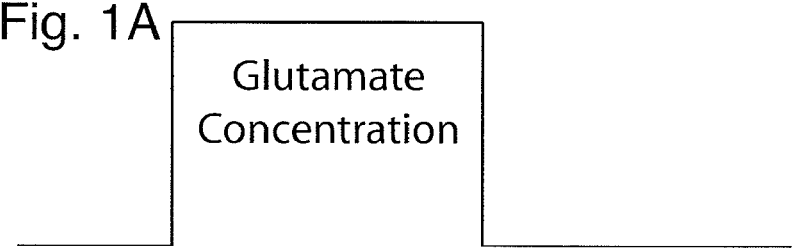
Fig. 1A Glutamate Concentration
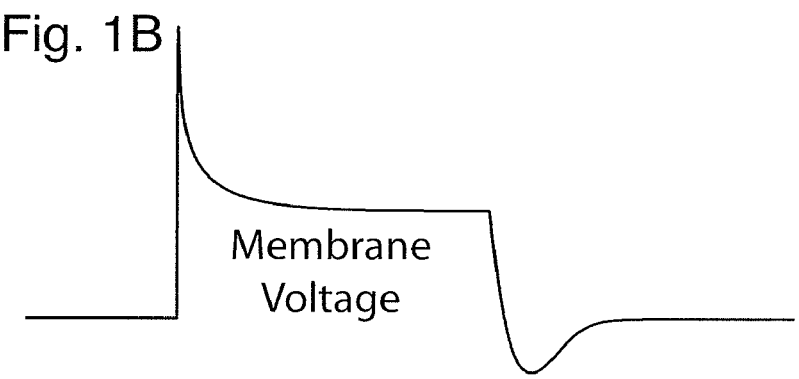
Fig. 1B Membrane Voltage
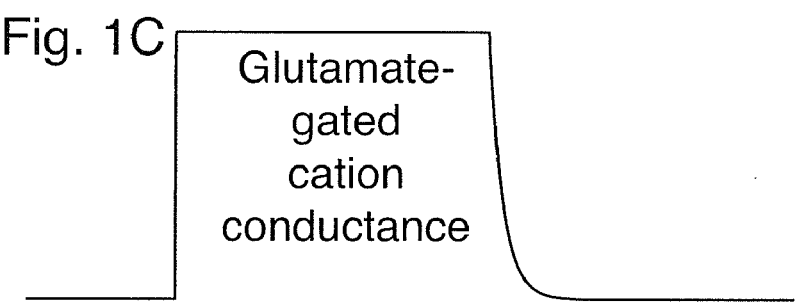
Fig. 1C Glutamate-gated cation conductance
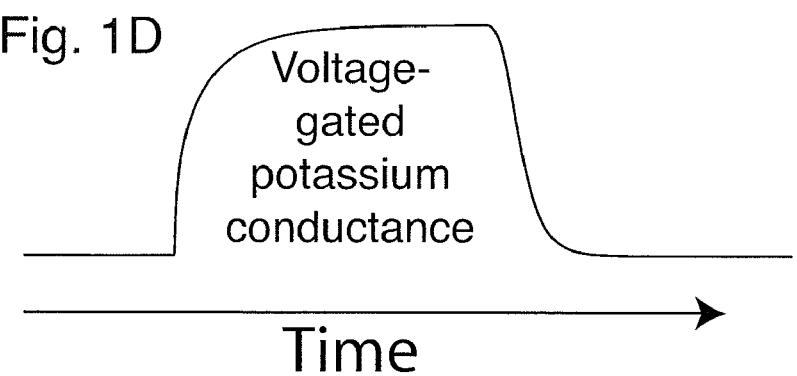
Fig. 1D Voltage-gated potassium conductance
Time

PREDICTION BY SINGLE NEURONS AND NETWORKS

CROSS REFERENCE TO RELATED APPLICATIONS

This patent application claims the benefit of U.S. provisional patent application Ser. No. 60/989,391, *Prediction by Single Neurons and Networks*, filed Nov. 20, 2007, the entirety of which is incorporated herein by this reference thereto.

BACKGROUND OF THE INVENTION

1. Technical Field

This invention relates generally to the field of neural network models and artificial intelligence. More specifically, this invention relates to a model of the computational function of a single artificial neuron.

2. Description of the Related Art

There has long been an interest in developing artificial systems that exhibit the intelligence of humans or other animals. One means of approaching this challenge has been to create computational systems that incorporate known elements of biological nervous systems. This approach has led to the creation of artificial neural networks. An artificial neural network consists of multiple inter-connected "neurons," in which the output of each neuron depends on the weighted sum of its inputs. The network as a whole receives external inputs and generates outputs. The goal of the system is to learn to generate appropriate outputs to each input pattern by adjusting the connection weights between neurons. The adjustment of connection weights may occur under the influence of some sort of feedback about the appropriateness of the output.

Neural networks have had some success in generating useful intelligence. But despite the fact that they have been around since the 1950's, significant efforts have failed to result in artificial intelligence that compares to that generated by biological nervous systems. Likewise, the neurons of artificial networks bear only a limited resemblance to biological neurons.

Biological nervous systems have the ability to learn for themselves (i.e. self-organize). A primary goal of research on neural networks has been to create artificial networks that can do the same. Ideally, a network would start with virtually no information about the world but would become knowledgeable over time on its own. Whether or not this could ever be achieved, a practical goal is to develop networks that are as general as possible in what they are able to learn, while having as little information as possible built in from the start.

Neural networks have typically been designed using substantial knowledge of how to solve a specific task. This is most obvious in the case of networks trained under the influence of an externally generated supervisory signal, which essentially tells the network what it is doing wrong. Thus the network is fed expert information. By contrast, biological nervous systems must learn for themselves through trial and error. Likewise, some artificial networks perform unsupervised learning, which by definition does not depend on an external supervisory signal. However, even these networks have generally been designed so that the network learns to perform a particular input-output transformation. Thus the designer builds the network with knowledge of how outputs should depend on inputs. Since the appropriate input-output transformation will be different for different tasks or environments, a network designed for one environment may not be able to adapt to a new environment. By contrast, biology discovers for itself how outputs should depend on inputs, and biological nervous systems can be remarkably adaptable to new environments. The present ideas are based on a computational model of biological neurons.

The goal of a network is to select appropriate outputs, a process that could be referred to as "decision making." The problem in making decisions is uncertainty about the current and future states of the world. The uncertainty in a prediction is inversely related to the amount of information upon which the prediction is based, and therefore minimizing uncertainty is the same as maximizing information. If the system could accurately predict the state of the world, then the problem would be solved, and the system would merely select the output that it knows is the most advantageous (e.g. the output that maximizes its expected future reward). The process of minimizing uncertainty is thus considered to be formally identical to the process of decision-making, since decisions are rendered trivial in the absence of uncertainty.

Any reference made to "information" herein refers to information that the network or a neuron holds within its biophysical structure. Even a single molecule, such as an ion channel in a neuronal membrane, contains information. By definition, information predicts something. Thus the prediction made by a neuron is entirely conditional on information possessed by the neuron. In the present work, the relevant information is not that which an observer of the network may have about the network or the world.

The present invention can be viewed as an application of fundamental principles of reinforcement learning to the computational function of a single neuron. Reinforcement learning is concerned with how a biological or artificial agent can learn on its own to achieve its goals. Since all of an agent's outputs should be selected in order to promote its future goals, an agent learns to predict "the sum of future rewards." Although the notion of future rewards is quite abstract and intangible, the agent predicts future reward by predicting concrete stimuli and events that are themselves predictive of future reward. Thus the agent tries to predict the current state of the sensory world because the sensory world is informative about future reward. For example, the sight of food is predictive of the ingestion of food, and thus an agent would like to be able to predict the sight of food.

To learn to make such predictions, the agent relies on prediction errors. A prediction error is the difference between what is expected and what is actually observed. The artificial neuron described here generates a type of prediction error, and uses it to learn to predict an aspect of the world that is itself potentially predictive of future reward. Whereas most past work on reinforcement learning has implemented principles of reinforcement learning at the level of networks and systems, the present work applies these principles to the function of a single neuron, and by extension, to a network of neurons.

Artificial neural networks are composed of multiple interconnected neurons. The output of each neuron is determined by the weighted sum of its inputs. Each input serves as an information source, and in principle, a neuron could have a virtually infinite number of inputs. But a neuron's output depends only on those inputs that have sufficiently high weights. Creating an intelligent network is therefore largely a matter of selecting the appropriate weights. Despite over 50 years of work on this problem, there has not been a generally accepted and universally applicable set of guidelines that specifies the weight that should be given to each of a neuron's inputs. Herein, new principles are described for choosing the weights of a neuron's inputs. Some inputs should be given high weights if they are unpredictable from the neuron's perspective, whereas others should be given high weights if they are effective predictors.

Although there are multiple means by which these new principles might be implemented, perhaps the most attractive embodiment would utilize plasticity algorithms. Real neurons communicate with one another through synapses in which information is traditionally thought to flow in one direction from the pre-synaptic to the post-synaptic neuron. The strength of the connection between two neurons is described by a weight, and many artificial neural networks employ plasticity algorithms that modify the weight according to coincident activity in the pre-synaptic input neuron and the post-synaptic output neuron. A commonly used class of plasticity rules is known as Hebbian. According to a Hebbian rule, a connection weight increases if activity in a pre-synaptic neuron is positively correlated with the activity of a post-synaptic neuron. Thus, if a pre-synaptic neuron excites a post-synaptic neuron at approximately the same time that the post-synaptic neuron is excited, then that connection weight increases. If the pre-synaptic neuron is excited at the same time that the post-synaptic neuron is inhibited, then the connection weight may decline.

A less often used form of plasticity in artificial neural networks is known as "anti-Hebbian." A Hebbian rule strengthens excitatory or inhibitory inputs that are paired with excitation or inhibition, respectively, and it therefore involves positive feedback. An anti-Hebbian rule does just the opposite and results in negative feedback. Thus an inhibitory input that is active at the same time that the post-synaptic neuron is excited would have its connection weight increased. Anti-Hebbian rules are known to be effective in decorrelating neural activity so as to promote efficient coding, and similarly, in learning to make predictions.

Although both Hebbian and anti-Hebbian rules have been explored in the literature for at least several decades now, the application of these plasticity rules to neural networks has not led to a general solution to the problem of creating artificial intelligence. Although each of these plasticity rules has been shown to have certain virtues, it has not been clear which type of plasticity rule should be applied to a particular neuron or to any of its individual inputs. Herein it is proposed that a particular combination of Hebbian and anti-Hebbian plasticity rules within a single neuron will be useful in creating artificial networks that learn to generate intelligent outputs.

In focusing exclusively on synaptic connectivity between neurons, most work on artificial neural networks has ignored an important aspect of biological neurons. The output of a biological neuron is not determined solely by its synaptic inputs. An approximately equal contribution is made by non-synaptic ion channels. The conductance of many of these ion channels is regulated by membrane voltage. An example would be a voltage-gated potassium channel that opens and inhibits the neuron once the membrane becomes depolarized. There are many different types of voltage-gated potassium channels that can be produced by each neuron, but somehow a particular neuron selectively expresses some types of potassium channels but not others. The rules that govern this selection process in biological neurons are not known, and the neurons of most artificial networks do not possess any analogue of these non-synaptic ion channels. The present invention identifies a key role for non-synaptic ion channels, and utilizes anti-Hebbian plasticity to select amongst different types of non-synaptic ion channel.

SUMMARY OF THE INVENTION

The present invention describes a method of information processing inspired by processes that may occur in biological neurons. The artificial neuron integrates multiple inputs, some of which are excitatory and others inhibitory. In the preferred embodiment, the output of the neuron is voltage, and the inputs are ionic conductances. These inputs are divided into two classes. The first class of inputs is said to provide current information, whereas the second class provides prior information (from other points in space and time). The inputs contributing prior information act to predict and counteract the effects of those contributing current information, and thus the output of the neuron can be viewed as a prediction error. If a neuron's current information is excitatory, then the neuron would be excited when excitation is greater than expected based on prior information, inhibited when excitation is less than expected, and would remain at an intermediate state when the level of excitation meets expectations.

Each input to a neuron would have an associated weight that quantifies the strength of its influence. The invention specifies the principles that should determine the weights. The key difference between the first and second classes of inputs is in the rules that are used to assign the weights. The first class of inputs should be selected (i.e. weighted) so as to maximize prediction error. This would insure that the neuron receives current information about an aspect of the world that is informative to the neuron, and thus interesting, because it is difficult to predict. The preferred embodiment implements the principle of maximizing prediction error through Hebbian plasticity. According to a Hebbian plasticity rule, an individual excitatory input that is active at the same time that the neuron is excited would be contributing to the prediction error and would therefore be strengthened. An excitatory input that is active when the neuron is inhibited would be counteracting the error and would be weakened. In a further embodiment, the Hebbian rule could also include some sort of feedback information related to the goals of the network, so that the neuron give high weights to those class one inputs that tend to be the least predictable but are also most closely tied to the network's goals.

The weights associated with the second class of inputs are to be chosen in order to minimize the prediction error and to thereby make accurate predictions. In the neuron of the preferred embodiment, this means giving high weights to those inputs that are most successful in driving the membrane potential towards the middle of its range where the error is zero. One means by which this could be accomplished is through an anti-Hebbian plasticity rule. An individual inhibitory input that is active at the same time that the neuron is excited (signaling a positive prediction error) would be counteracting the error and would therefore be strengthened, whereas an inhibitory input that is active when the neuron is inhibited would be contributing to the error and would therefore be weakened. This rule allows the second class of inputs (those contributing prior information) to learn to predict and cancel the effects of the first class of inputs (those contributing current information) on the neuron's output.

By utilizing both anti-Hebbian plasticity to select amongst prior information sources, and Hebbian plasticity that incorporates reward feedback, this artificial neuron learns to predict future reward. As recognized within the field of reinforcement learning, the prediction of future reward is critical to the generation of intelligent behavior. Whereas one of these neurons could integrate a small amount of information to predict a reward-related aspect of the world, a network of these neurons could learn to predict the most important aspects of the world and to generate intelligent behaviors.

BRIEF DESCRIPTION OF THE DRAWINGS

FIG. 1A-1D are illustrations of the conductance and membrane voltage response of a simplified neuron to a square-wave pulse of glutamate, said neuron possessing glutamate-gated cation channels and voltage-gated potassium channels, as known in the prior art;

DETAILED DESCRIPTION OF THE INVENTION

A biological neuron is described in order to illustrate how the artificial neuron of one embodiment learns to make predictions.

Biophysics and Prediction Error

A neuron integrates information in the voltage differential across its membrane. A neuron expends energy to maintain a higher concentration of sodium ions on the outside of its membrane, and a higher concentration of potassium ions on the inside. A neuron has pores or channels in its membrane, which differ in the ions that they allow to pass. For example, some ion channels are selective for potassium, and thus when they open, potassium flows down its concentration gradient, exiting the neuron and thereby hyperpolarizing the membrane towards the potassium equilibrium potential, which is usually about −100 mV. Neurons typically have many different types of ion channels, but the simplest neuron that could possibly integrate information in its membrane voltage would have just two types of channels that differ in their ionic selectivity.

Such a simplified neuron contains one set of channels that are permeable to both sodium and potassium, and these channels therefore have an equilibrium potential of zero millivolts ($E_{cat}$=0). They open in the presence of a sufficient concentration of an external chemical. In this example, the chemical is glutamate, and thus these are glutamate-gated ion channels. The second type of channel conducts potassium when it is open, and it is gated by membrane voltage. The potassium equilibrium potential is −100 mV ($E_K$=−100). The voltage across the neuron's membrane therefore approaches a steady-state value ($V_\infty$) of $$V_\infty = \frac{G_{cat}E_{cat} + G_K E_K}{G_{cat} + G_K} \quad (1)$$

where $G_{cat}$ and $G_K$ are the cation and potassium conductances, respectively.

The response of such a neuron to a square-wave pulse of glutamate is shown in FIG. 1 (prior art). The neuron is depolarized when glutamate-gated channels open, but then it gradually repolarizes as voltage-gated potassium channels begin to open. Information about glutamate concentration therefore flows to glutamate-gated channels, then to membrane voltage, and then to potassium channels. Since voltage is the output of the neuron, the conductance of the potassium channels corresponds to a memory of past outputs.

Figure 2:
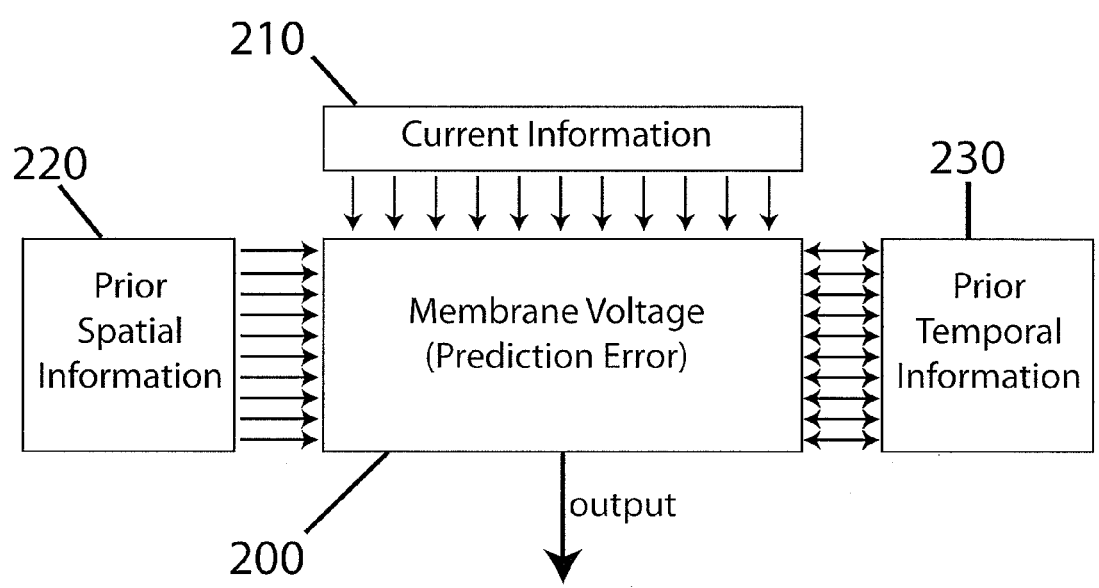
FIG. 2 illustrates the inputs or information sources to a single artificial neuron, where each arrow indicates the direction of information flow for an individual input according to one embodiment of the invention.

Both sets of channels contain information about glutamate concentration, and thus they can each estimate or predict glutamate concentration. At each brief moment in time, the conductance of the potassium channels depends only on past glutamate concentrations, whereas the conductance of glutamate-gated channels depends at least in part on current glutamate concentrations. Therefore, the glutamate-gated channels possess current information about glutamate concentration, whereas the potassium channels possess prior information about glutamate concentration. The neuron can therefore be understood as having two predictions of glutamate concentration, one conditional on current information (i.e. class one inputs), and the other conditional on prior information (i.e. class two inputs). The membrane voltage depends on a comparison of the two predictions or sets of information (FIG. 2).

When the estimate of glutamate concentration by the glutamate-gated channels exceeds the estimate made by the potassium channels, the neuron is depolarized. The neuron is hyperpolarized when the opposite is true. When both sets of ion channels have nearly the same information, the membrane voltage is at an intermediate voltage. This is illustrated in FIG. 1, which shows the response of a neuron with only these two types of ion channels to a square-wave pulse of glutamate. The neuron's membrane voltage (FIG. 1B) can therefore be thought of as a prediction error. The neuron is most surprised and most depolarized immediately after the rise in glutamate concentration, corresponding to a positive prediction error. This is due to the mismatch between the conductances of the two channel types (compare FIG. 1C to FIG. 1D). The hyperpolarization that follows the drop in glutamate concentration would correspond to a negative prediction error.

This positive or negative prediction error is referred to below in the claims as a "discrepancy." Its physical correlate in the preferred embodiment is the voltage across the neuron's membrane, with an intermediate voltage corresponding to zero prediction error. The precise quantitative relationship between membrane voltage and prediction error is assumed to be monotonic, but not necessarily linear. Likewise, references below to maximizing or minimizing prediction error are intended to apply to any process performed on any monotonic function of prediction error or membrane voltage.

The signaling of prediction error is known to have substantial advantages. The principle of only responding to errors in prediction is that there is no need for a neuron to "teach" itself what it already knows, nor is it generally desirable to tell target neurons what they have already been told. The utility of prediction errors has long been recognized in the literature on reinforcement learning and efficient coding. The output of the neuron of FIG. 1 can be described as a prediction error, since the memory of past outputs carried by the voltage-gated potassium channels counteracts the excitation by glutamate-gated channels. However, the typical neurons of artificial neural networks lack non-synaptic ion channels such as these.

In the example given above, glutamate concentration is the neuron's stimulus. A neuron's stimulus is defined here as the part or aspect of the world that the neuron estimates or predicts. A neuron naturally contains information within its biophysical structure, and that information must be about some aspect of the world which is defined here as the neuron's stimulus. As described in detail further below, a neuron's stimulus is defined precisely by the weighted sum of the neuron's first class of inputs. A neuron's stimulus typically varies in its intensity in a nearly continuous manner, but in principle it could instead exists in one of just a small number of possible states. A prototypical neuron receives current information from multiple individual glutamate synapses, and thus its stimulus is the local glutamate concentration summed across these synapses.

In general, a neuron has multiple types of ion channels that contribute prior information. These channels function to predict and cancel the effect of those channels contributing current information. Channels contributing prior information tend to modulate their conductance in a manner that drives membrane voltage towards a midpoint that corresponds to zero error. Thus the neuron's prior information functions to minimize prediction errors. This principle is illustrated in computational models of neurons in the retina.

A neuron can estimate current light intensity in a small region of space simply by expressing photosensors that are spatially localized. However, light intensity under natural conditions displays strong positive correlations between neighboring points in space and time. Thus an alternative means of estimating current light intensity at a small point in space (i.e. the center) would be to use only information from the recent past and from neighboring points in space (i.e. the "surround"). The proposal is that a neuron receives some inputs that contribute current information directly from the point in space that is of interest, and other inputs that contribute prior information from neighboring points in space and time. The neuron compares these two estimates, or sets of information, and its output corresponds to the discrepancy between the two (equation 1) (FIG. 2). This discrepancy is more commonly referred to here as prediction error.

The suggestion that a neuron's output corresponds to prediction error is purely descriptive. The concept of prediction error is useful for understanding the flow of information and the function of the model neuron. The rationale for this term becomes more clear in light of the plasticity rules described below. However, the notion of prediction error places no constraints on the processing performed by a neuron, which is determined purely through well established biophysics, as exemplified by equation 1. Nor does the concept of prediction error place any constraints on the information possessed by a neuron. A neuron's predictions are simply conditional on whatever information the neuron happens to have. In principle, a neuron's prediction could have infinite uncertainty, corresponding to a complete lack of information. However, the plasticity rules described further below would usually allow a neuron to gather relevant information so that the concept of prediction error becomes useful in describing the neuron's computational function In one embodiment, the output of a neuron corresponds to its membrane voltage. By contrast, most real neurons communicate to other neurons through all-or-nothing action potentials that are triggered when membrane voltage crosses a threshold. In such a case, the output of a neuron at a brief moment in time would be binary. A digitized output represents a loss of information relative to that contained in the analog voltage signal. However, a digitized output is advantageous for reliable communication across longer distances. Many neurons that do not transmit information across long distances do not emit action potentials but signal using a graded membrane potential. The preferred embodiment is based on such a graded-potential neuron. However, it should be clear that the principles of the invention could be implemented instead in a spiking neuron with a binary output.

Selection of Prior Information Sources

The neuron receives multiple individual inputs, each of which contributes information from a different point in space or a different period of the past. Each of these individual inputs functions as a source of information. Somehow a neuron selects some of these information sources and discards other. As described above, the neuron receives two classes of inputs, those contributing current information and those contributing prior information. Current information sources are selected to maximize the neuron's prediction errors (i.e. cause the membrane voltage to approach its limits of hyperpolarization and depolarization), whereas prior information sources are selected to minimize the neuron's prediction errors (i.e. cause the membrane voltage to approach an intermediate value). Although there are multiple means by which this end might be achieved, the neuron of the preferred embodiment does so through Hebbian and anti-Hebbian plasticity.

The inputs that contribute prior information span a spectrum of points in space and time, and a neuron is proposed to select those inputs that best minimize the error in predicting stimulus intensity. Which period of the past a channel represents (its "memory") depends on its kinetic properties. In the simplest case, a channel's gating kinetics could be governed by a single exponential process, but the gating of real channels typically depends on relatively complex interactions of multiple exponential processes. There are numerous types of non-synaptic ion channels that differ in their kinetic properties as well as in their voltage dependence, with the diversity of potassium channels being particularly striking. Different types of channels carry information from different periods of the past. However, a neuron expresses only a subset of these ion channels. By expressing only a subset of these ion channels, a neuron selects to maintain a memory of some periods of the past but not other periods. It is proposed that the pattern of a neuron's stimulus, acting via the voltage-mediated error signal, would select the types of non-synaptic ion channel, and the corresponding periods of the past, that best predict stimulus intensity. An analogous process would also occur in the spatial domain, where discrete synapses represent discrete points in space. For example, as in the case of the retina described above, an individual input could be an inhibitory synapse representing light intensity in a particular region of the surround (determined by the presynaptic neuron's stimulus, or receptive field center). Those synapses from the surround that best predict stimulus intensity in the center would be strengthened.

To illustrate how this occurs, we again consider a neuron in which the inputs contributing prior information consist only of potassium channels. Now there are distinct types of potassium channels that vary in their kinetic properties. The total potassium conductance ($G_K$) at a given moment in time is the weighted sum of the activities of each component (i) or type of potassium channel.

$$G_K = \Sigma_i w_i U_i \qquad (2)$$

The activity of a component ($U_i$) refers to the time- and voltage-dependent likelihood that a channel of that type is open at a given moment (i.e. the channel's open probability in a Hodgkin-Huxley type model of average channel behavior). A component's weight ($w_i$) corresponds to the number of functional channels of that type. The weights could be adjusted by inserting or removing channels from the membrane, or by an event such as phosphorylation that could cause a channel to switch from one functional type to another.

Minimizing the error corresponds to driving the membrane potential towards the middle of its range where the error is zero. In the typical case in which current information sources are depolarizing, depolarized potentials would correspond to positive errors and hyperpolarized potentials would correspond to negative errors. If a depolarization-activated potassium channel is open when the membrane is depolarized (positive error), it is correctly guessing that glutamate concentration is high even though the neuron's prior information sources as a whole guessed too low. Therefore the weight of that type of potassium channel should be increased (made more negative, as specified below in equation 3). If the membrane is hyperpolarized (negative error) when a potassium channel is open, then channels of that type should be removed since they guessed too high and contributed to the negative error. If a potassium channel is closed, it bears no responsibility for whatever the voltage may have been, and its corresponding weight should not be changed substantially. The same principles could be applied to adjusting the weight of a channel type that depolarizes the membrane when it is open and conducting.

These principles suggest a learning rule like the following:

$$w_{t+1} = w_t - \alpha U_t(V_t - \theta) - \beta w_t \qquad (3)$$

where the weight (w) of an individual component is updated at each moment in time (t) according to its activity (U), membrane voltage (V), and learning rates ($\alpha$ and $\beta$). A weight in this case could be any negative real number. The last term ($\beta w_t$) would correspond to channels being removed from the membrane at a low rate, which would help to insure that the weight of channel types in which activity is not substantially correlated with membrane potential approaches zero. The term $\theta$ refers to a voltage near the middle of the range. It functions as the null point of membrane voltage where there is no error; it could be a constant or it could vary. Depolarization beyond $\theta$ would increase weights, whereas hyperpolarization would decrease weights.

Equation 3 is appropriate for potassium channels and others that exert a hyperpolarizing influence on membrane voltage. However, some channel types that contribute prior information may have a depolarizing influence (such as HCN cation channels that are activated by hyperpolarization). The weight of this type of channel should be increased when these channels are open at the same time that the neuron is hyperpolarized, since the channels would then be counteracting the negative error. This would be achieved if the first minus sign in equation 3 (the one furthest to the left) were changed to a plus sign in the case of depolarizing inputs.

Plasticity algorithms such as Equation 3 are often referred to as "anti-Hebbian." A Hebbian rule strengthens depolarizing or hyperpolarizing inputs that are paired with depolarization or hyperpolarization, respectively, and it therefore involves positive feedback. An anti-Hebbian rule does just the opposite and results in negative feedback. Anti-Hebbian plasticity has previously been proposed to govern the strength of some synaptic connections, in both biological and artificial neural networks. The present artificial neuron extends its application to selecting among non-synaptic ion channels. Within the present framework, a functionally relevant term for an anti-Hebbian rule would be "error minimizing."

By utilizing anti-Hebbian plasticity to select amongst prior information sources, the neuron described above is able to learn to predict the state of a part of the world. Which part of the world the neuron learns to predict will depend on its current information sources (which define its stimulus). Just as a neuron selects amongst its prior information sources, it also selects amongst its current information sources. This selection process should insure that the neuron's information is about an aspect of the world that is interesting and important.

Selection of Current Information Sources

The neuron described above would learn to predict whatever stimulus provides it with current information. However, real nervous systems are only concerned with aspects of the world that are relevant to future reward. Future reward as used herein is very similar to use of the term in reinforcement learning, in which a key goal is to predict the sum of future rewards. The general function of the nervous system is to predict (i.e. minimize uncertainty about) future reward. Future reward is ultimately defined in terms of biological fitness, or the ability of an animal to perpetuate its genetic information, which is the goal of all life forms. In the case of an artificial neural network, future reward would correspond to the future success of the network in achieving its goals (as defined by the network's designer). Since all of a system's outputs should be selected to promote future reward, all the system's information should be about future reward. The term "reward," as used herein, refers not only to good outcomes, but rather to a measure of value that ranges from bad to good.

This broad and inclusive concept of future reward is quite abstract and intangible. However, as in reinforcement learning, a system predicts future reward by predicting concrete physical stimuli that are themselves predictive of future reward. These stimuli would include every aspect of the world that can be sensed by the nervous system, where a stimulus could correspond to a part of the external world or to part of the system's internal world. For example, this includes generally weak predictors of future reward such as light intensity, as well as strong predictors such as the sight or taste of food. For a neuron in the motor system, the reward-predictive stimulus could correspond roughly to a plan for action. Thus the current state of the world is not of interest in itself, but rather it is of interest only because it contributes information about the future, and specifically about future reward.

Just as a neuron may select which points in space and time are most informative in predicting stimulus intensity, it may also select the stimulus that is most informative about future reward. A prototypical neuron's proximal stimulus is defined as the glutamate concentration summed across a subset of synapses. Each discrete synapse corresponds to an individual source of current information. The neuron selects its stimulus, or set of current information sources, by giving high weights to some synapses and low weights to others.

There are two criteria that are important in selecting amongst sources of current information. First, those individual inputs (i.e. synapses) in which activity is predictive of established reward predictors (e.g. food) should become strong. If a neuron is to learn on its own which inputs are the best predictors of reward, it would require some form of reward feedback. One example of reward feedback would be the reward prediction error signaled by midbrain dopamine neurons, which integrates a vast amount of the system's information and signals whether the current state of the world is better or worse than expected. Another form of reward feedback could come from the top-down feedback projections that mediate selective attention in the neocortex. A reward feedback signal could be much less sophisticated than these examples, and in the simplest case it would be provided solely by natural selection over generations. In an artificial neural network, reward feedback could be provided either by other neurons in the network, or by an external supervisory signal. As for all aspects of the present model, the neuron simply works with whatever information it happens to have. As described below, relevance to reward is not the only criterion a neuron should use in selecting its class one inputs, and the model neuron does not necessarily require any reward feedback.

The second criterion is that to best predict future reward, a neuron should select the stimulus (i.e. set of class 1 inputs) that is the least predictable given the neuron's prior information. This is similar to the principle in statistics that the greater the variance in one parameter (e.g. light intensity), the greater its potential to explain the variance in another parameter (e.g. availability of water). However, even if the intensity of a stimulus has a high variance, and it is correlated with reward, it is not useful to a neuron if it is highly predictable, since it would merely be telling the neuron what the neuron already knows. The most unpredictable inputs are therefore the most informative. Thus, other things being equal, it is the most unpredictable stimulus that would be expected to provide the neuron with the most information about future reward.

One way in which a neuron could select a stimulus that is both predictive of future reward and unpredictable is through application of a learning rule similar to that given above (Equation 3), but with a sign change and now also including any reward information (R) that might be available:

$$w_{t+1} = w_t + \alpha R_t U_t (V_t - \theta) - \beta w_t \tag{4}$$

The weights (w) in this equation could be any positive real number. If the only feedback about reward is provided by natural selection over generations, then R would be constant over the lifetime of the organism, and this rule would simply tend to select the stimulus that is the least predictable. Although not shown in Equation 3, reward information may also shape the selection of inputs contributing prior information. However, even without a direct influence of reward in Equation 3, the influence of reward in Equation 4 insures that a neuron's prior information is predictive of future reward. The goal of this plasticity rule (equation 4) could also be achieved if weight changes were to depend on the conjunction of presynaptic activity at one moment and postsynaptic activity a short time later, as in the case of spike-timing dependent plasticity.

Equation 4 applies to the prototypical case of inputs, such as glutamate synapses, that are depolarizing. However, if an input has a hyperpolarizing influence, then the plus sign in equation 4 would be changed to a minus sign. This would insure that hyperpolarizing inputs that coincide with hyperpolarization, and thus contribute to negative errors, are strengthened (i.e. their weights are made more negative).

The plasticity algorithm of equation 4 is a Hebbian-type rule, and it tends to maximize the neuron's prediction errors. This type of rule strengthens synapses in which activity tends to be synchronous. Synchronous activation would occur more frequently in a subset of synapses that are driven by a recurring spatial pattern or object in the external world. Those synapses would become strong, thereby shaping the stimulus to which the neuron is tuned.

Although Hebbian plasticity is often utilized in artificial neural networks, the distinct proposal of the present work is that a Hebbian rule functions to maximize errors, and to suggest why this is advantageous in learning to predict future reward, the ultimate goal of the nervous system. An error-maximizing rule insures that the stimulus contributes information that the neuron does not already possess. For example, if a neuron receives a stereotyped temporal sequence of excitatory synaptic inputs, then the Hebbian rule will selectively strengthen the first input in the sequence (since prior information will tend to suppress responses to the latter excitatory inputs). The first input is the sequence is the most informative since it predicts the latter inputs, and it could allow for the network to prepare appropriate behavioral outputs in anticipation of the latter events. Thus the error-maximizing rule explores the external environment to identify the best source of external information about future reward, whereas the error-minimizing rule identifies the internal substrate that is best able to capture and hold that information. They both function together to maximize the neuron's information about future reward.

Although the focus of the above discussion has been on selecting amongst information sources from discrete points in space (i.e. synapses) or discrete periods of the past (i.e. types of ion channel with distinct kinetics), these same rules could also select amongst other aspects of a neuron's ion channels and their modulatory proteins. For example, the neurotransmitter receptors that gate ion channels could differ in their ligand affinity, or they could differ in their rates of desensitization. In a simulation described below, a Hebbian rule selected an ion channel subtype with a ligand affinity appropriate to the actual range of ligand concentrations to which the neuron was exposed. Similarly, voltage-gated potassium channels can differ in their voltage-dependence (even while having similar kinetic properties), and an anti-Hebbian rule could select the one that best predicts and counteracts deviations in membrane voltage. In principle, every input to a neuron could be selected by one of these two types of plasticity rules, regardless of the dimensions across which inputs may vary.

Hebbian and anti-Hebbian plasticity rules are recognized within the prior art to be classes of plasticity algorithms, and the particular algorithms given above in Equations 3 and 4 are intended only as examples of these classes.

What a neuron is capable of learning would obviously depend on the set of information sources that are available to it. In designing an artificial network, the designer would need to choose what information sources are available to each neuron. A neuron could obviously receive an input from every other neuron in the network (even if some inputs have weights of zero), or from only a subset of neurons. Similarly, the designer would need to decide upon the kinetics of a neuron's non-synaptic ion channels, or equivalently, which memory traces of its past outputs are available to the neuron as sources of prior information. The invention places no limitations on the information sources available to a neuron, which would chosen by the designer of a network. For example, the kinetic properties of real ion channels would not constrain the sorts of memory traces that are available to an artificial neuron. Furthermore, the designer could arrange for a presynaptic neuron to supply two inputs to a single postsynaptic neuron. The weight of one of these could be controlled by a Hebbian rule, whereas the other could be controlled by an anti-Hebbian rule. The plasticity rules would determine whether the presynaptic neuron contributes current information, prior information, or neither. The guiding principle is that the neuron works with whatever information sources are available it, and it is left to the designer to determine what information sources will be available to the neuron.

Alternatives to Hebbian and Anti-Hebbian Plasticity

A central tenet of the invention is that some of a neuron's inputs are to be selected to maximize prediction error, whereas others are to be selected to minimize prediction error. Plasticity rules are only one means to achieve this end. Plasticity rules have at least two distinct advantages. First, each weight is modified using only information that is locally available. Thus these rules are be implemented in hardware, including biological systems. Second, plasticity rules are constantly updating the weights, thereby allowing a neuron to continually adapt to a changing environment. These features make it possible for an artificial network to learn for itself, so that it does not need to have information fed into it from an external source. Hebbian and anti-Hebbian plasticity rules are therefore utilized in the preferred embodiment.

In an alternative embodiment of the invention, statistical estimation procedures are used to determine a neuron's optimal input weights. Linear mean squared estimation can be used to determine the best sources of prior information for minimizing error. For example, one can use this technique to select those regions of the surrounding space and those periods of the past in which light intensity is the best predictor of current light in a central region. Whereas this technique is designed to minimize squared errors, an analogous statistical technique could be used to choose the weights of class one inputs (i.e. current information sources) in order to maximize squared errors. Because each weight can be determined using information about all other weights and intensities at many points in space and time, this and other statistical methods could potentially select a set of weights that is closer to optimal than the set of weights obtained by a plasticity rule. However, because such statistical methods do not depend only on local information, this approach may require feeding expert information into the network.

In another embodiment of the invention, the designer of the network could choose a neuron's inputs in accord with the principles described here but without the aid of plasticity rules or statistical techniques. For example, if a neuron's stimulus is the position of an object, then we know that the object has mass and therefore also has inertia. Based on this simple knowledge, and nothing more, a neuron could minimize its prediction error if its sole source of prior information derives from the position of the stimulus in the preceding moment since the most recent past is always a better predictor than the more distant past. Such a neuron would be excited or inhibited when the position of its stimulus is different from its position in the last moment. A plasticity rule or a statistical method may have this same result, but it can be deemed unnecessary in such a case. Thus the principle of minimizing or maximizing the neuron's prediction error is implemented directly by the designer of the network based on available knowledge.

Summary of Embodiment Illustrated in FIG. 2

FIG. 2 illustrates the inputs to a single neuron in the preferred embodiment. Each arrow represents an individual input (i.e. a distinct population of ion channels) and its corresponding direction of information flow. Each input would be either excitatory (i.e. depolarizing) or inhibitory (i.e. hyperpolarizing). The number of individual inputs is not constrained by the invention, and the number shown here was chosen for illustrative purposes only. Each individual input is associated with a modifiable weight that indicates the strength of its contribution to the neuron's membrane voltage. Membrane voltage 200 corresponds to prediction error and serves as the neuron's output. Each individual input is "tagged" according to whether its weight is determined so as to maximize or minimize prediction errors.

The weights associated with a first class of inputs 210 are selected to maximize prediction errors. These inputs are described here as contributing current information, and in the preferred embodiment their weights are determined by a Hebbian plasticity rule. The weights associated with a second class of inputs 220 and 230 are selected to minimize prediction errors. These inputs are described here as contributing prior information, and in the preferred embodiment, their weights are determined by an anti-Hebbian plasticity rule.

Those inputs contributing current information 210 and prior spatial information 220 come from other neurons in the network (i.e. synaptic inputs) or from sources external to the network. By contrast, those inputs contributing prior temporal information 230 come from ion channels regulated by the same neuron's membrane voltage. The activity or conductance of each of these inputs depends on past membrane voltages and influence current membrane voltage. Thus information flows in both directions between membrane voltage 200 and the activity or conductance of these inputs 230. Each individual input contributing prior temporal information corresponds to a type of channel with distinct kinetic properties. A channel's kinetic properties determine which period of the past it remembers, and thus distinct channels contribute distinct prior temporal information (i.e. memories). In one embodiment, the neuron integrates its inputs according to the established biophysical rules that apply to biological neurons (e.g Equation 1).

The Network

The above description is concerned with inputs for a single neuron. A single neuron may have some utility by itself, but it is intended to serve as an information processing element in a network of neurons. In one embodiment, each neuron initially differs only in its spatial location within the network, the sign of its output (i.e. excitatory or inhibitory), and its randomly selected input weights. Through. modification of its weights, the network would learns to achieve its goals.

The prediction of future reward is the central function of the nervous system, and the neuron described above performs this function. A single neuron predicts the state of only a small part of the world, and that part of the world may not be tightly linked to future reward. However, if each individual neuron performs this central function, a system of neurons can be assembled to work together to better predict future reward. Because each neuron is at least roughly similar in its biophysical characteristics, each neuron possesses a similar amount of information about its stimulus. However, some stimuli are highly informative about future reward (e.g. the sight of food), whereas others are only weakly linked to future reward (e.g. light intensity). Thus neurons differ in how much information they have about future reward, and this is the critical variable at the level of the network.

Because reward feedback contributes to the selection of each neuron's stimulus via Equation 4, the stimulus of each successive neuron in a series progressing from the network's sensory inputs to its motor outputs is more closely tied to future reward and less closely related to the immediate sensory world. Neurons further from the sensory periphery therefore have more information and less uncertainty about future reward. This phenomenon can be illustrated by tracing a long path from the retina through the cortex to a motor neuron. In the visual system, the stimulus of successive neurons is transformed from small circles of light intensity to oriented bars and eventually to faces. Higher neurons in the parietal and prefrontal cortex respond to relevant information, regardless of modality. Further along this path, neurons continue to become more selective for future reward, but they also become more motor by integrating proprioceptive and vestibular information specifically related to particular limbs and muscles. As the last neuron in the path, the stimulus predicted by a motor neuron would correspond roughly to a plan for action. Because the cumulative effect of reward feedback at every upstream synapse shapes the motor neuron's stimulus, the motor neuron has less uncertainty about future reward than any of its upstream neurons. Likewise, the motor neuron renders the system's decision.

The amount of reward information possessed by a neuron and its stimulus also varies across sensory modalities. For example, because taste is more strongly correlated with future reward than is light intensity, a gustatory cell in the tongue has more information and less uncertainty about future reward than does a photoreceptor. Likewise, a gustatory cell is closer to motor neurons (i.e. separated by fewer synapses) than a photoreceptor. If a gustatory path and a visual path both converge upon the same motor neuron, then they produce the same reduction in uncertainty about future reward. However, because light intensity is a lesser predictor of future reward, the long path of the visual system must do more work than the short path of the gustatory system in order to cause the same reduction in reward uncertainty. However, in doing substantial work to extract reward information from light intensities, the long path of the visual system achieves a much greater reduction in uncertainty about the world in general.

The ability of a network of these neurons to learn to generate an intelligent and useful output is largely dependent on the presence of one or more reward feedback signals. In one embodiment, the appropriate form of reward feedback is not specified. Rather the artificial neuron makes use of reward feedback so that the network's information is relevant to its goals. In the absence of reward feedback, a network of these neurons learns to predict the state of aspects of the world that are difficult to predict. For example, such a network might learn to see, to understand and predict the visual world. It could learn to recognize objects, but unlike a biological system, it does not view some objects as more important than others. Such a network is informative to an external observer, and thus is useful, but is not suitable for generating goal-related motor outputs that resemble those of a biological system.

A critical issue in designing a network of these neurons concerns the form or forms of reward feedback. 'Reward feedback' refers to information about how well the network's goals are being achieved. Through its influence on Hebbian plasticity, as indicated in equation 4, this reward feedback will determine the information that a neuron and a network acquire. Reward feedback helps to insure that all of the network's information is relevant to the network's goals. The form of reward feedback is not specified here, although several examples have been provided above. It could come from special neurons within the network that, rather than being simply excitatory or inhibitory, have a modulatory effect analogous to the neurotransmitter dopamine. Alternatively, it could be provided from a source external to the network, in which case the network would be said to learn in a supervised manner. Thus there are multiple embodiments that differ in their reward feedback. A critical aspect of these neurons is that they are able to make use of whatever reward feedback is provided in order to predict those aspects of the world that are most relevant to the network's goals.

Biological neural networks are only concerned with those aspects of the world that are of potential relevance to an animal's goals. But one can imagine an artificial network that is interested in predicting the state of the world in the absence of any specific behavioral goal (i.e. understanding just for the sake of understanding). Thus, in one embodiment, no reward feedback is provided. To imagine how such a network might function, a useful analogy may be drawn to the visual system. Later stages of the visual system are strongly biased in favor of reward relevant information. Under the influence of reward feedback, the visual system learns to perform detailed processing of faces, while largely ignoring objects such as rocks. But the early visual system learns recognize and discriminate all sorts of objects, regardless of their relevance to reward. A network of these neurons that learns in the absence of reward feedback would likewise be expected to recognize and discriminate objects. For example, it has been shown that Hebbian plasticity could cause neurons to become selective for elongated regions of contras. Hebbian plasticity could therefore account for the stimulus selectivity of simple cells of primary visual cortex. Thus a network that lacks reward feedback might be capable of learning to see (i.e. predict the state of the visual world).

Simulation

In one embodiment of the invention, a network of one or more neurons is simulated using a computer. The results of such a simulation are presented herein.

Previous studies have demonstrated how Hebbian or anti-Hebbian synaptic plasticity rules could shape a network (although the proposed combination of both rules has not been simulated). An embodiment of the present invention extends the application of these same sorts of plasticity rules to the selection of non-synaptic ion channels. In this simulation a single neuron selected from amongst a spectrum of non-synaptic ion channels, as shown in FIGS. 3A-H.

The simulation is based on a single compartment, graded potential (i.e. no action potentials), Hodgkin-Huxley type model neuron. The neuron simultaneously selected from among four subtypes of glutamate-gated cation channels through a Hebbian rule (Equation 4), and from among nine subtypes of voltage-regulated potassium channels through an anti-Hebbian rule (Equation 3). Channel activity (i.e. open probability, "U" in equations 2-4) varied continuously between 0 and 1, as shown in FIGS. 3C, 3E, and 3G. The number of channels of each type (i.e. "w" in equations 2-4) could assume any positive real number. The unit conductance of each channel was one.

For the plasticity rules of equations 3 and 4, $\theta$ was chosen to be −50 mV, midway between the potassium and non-selective cation reversal potentials. The rate constant $\alpha$ was 0.1 and 1.0 for the anti-Hebbian rule of equation 3 and the Hebbian rule of equation 4, respectively. For each rule, $\beta$ was 0.0000001. Besides the particular pattern of glutamate concentration, the plasticity rates were the only free parameters in the simulation. Other parameters were chosen either to approximate known physical values or, in the case of channel subtypes, to span a spectrum of relevant kinetics or glutamate affinities. The greater value of $\alpha$ in the anti-Hebbian rule relative to the Hebbian rule was chosen to constrain growth in the number of glutamate-gated channels resulting from the positive feedback of the Hebbian rule (by making the negative feedback of the anti-Hebbian rule faster). The "passive" decay rate ($\beta$) was chosen to be much less than the "active" plasticity rate ($\alpha$), which in turn was chosen to be slow in comparison to the rate of change in channel activities.

Figure 3A:
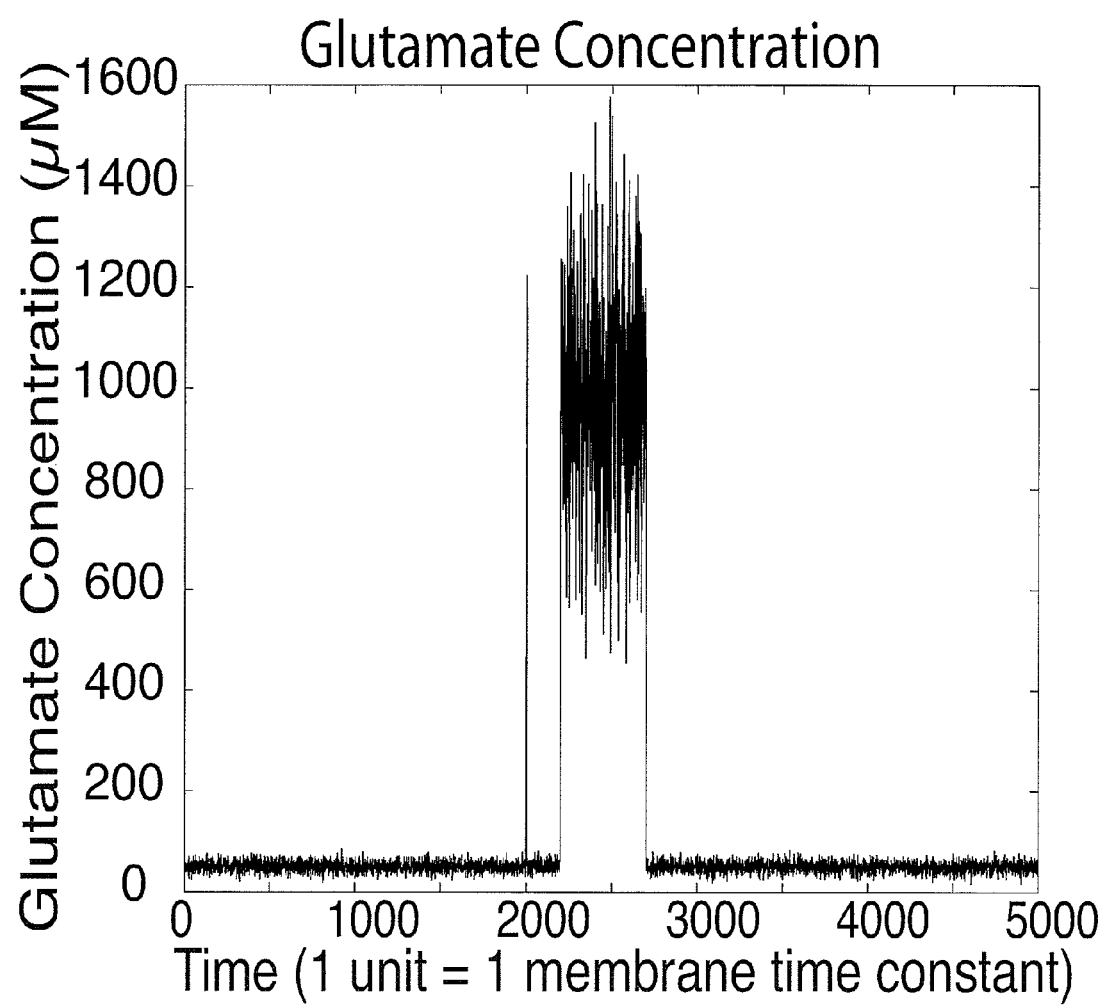
FIG. 3A-3H illustrate the results of a simulation of a single-compartment, graded-potential, Hodgkin-Huxley-type model neuron that selected among different types of ion channels according to Hebbian and anti-Hebbian plasticity rules.

At each time step, glutamate concentration was drawn from a Gaussian distribution with a standard deviation of 20% of the mean, as shown in FIG. 3A. The mean concentration increased from 50 to 1000 µM for ten time steps starting at 2000, and again for 500 time steps starting at 2200. After 5000 time steps the pattern repeated, for a total of 20,000 cycles. Initially, there were a total of 800 glutamate-gated non-selective cation channels, evenly divided among four subtypes, and 800 voltage-gated K+ channels, evenly divided among nine subtypes. Two other simulations began with different numbers and proportions of channels (not shown). The final numbers of channels of each subtype were the same in all three simulations, regardless of the starting numbers.

Figure 3B:
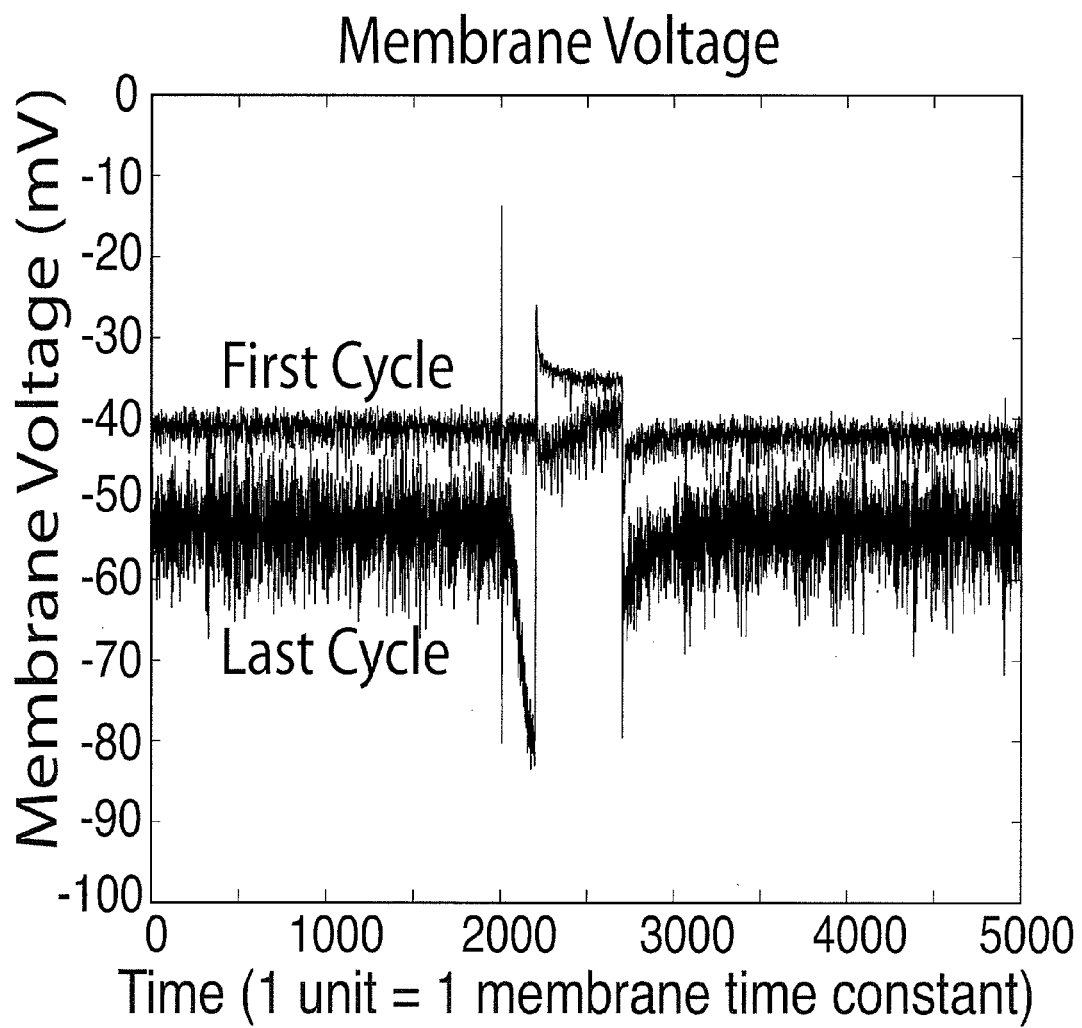
Figure 3C:
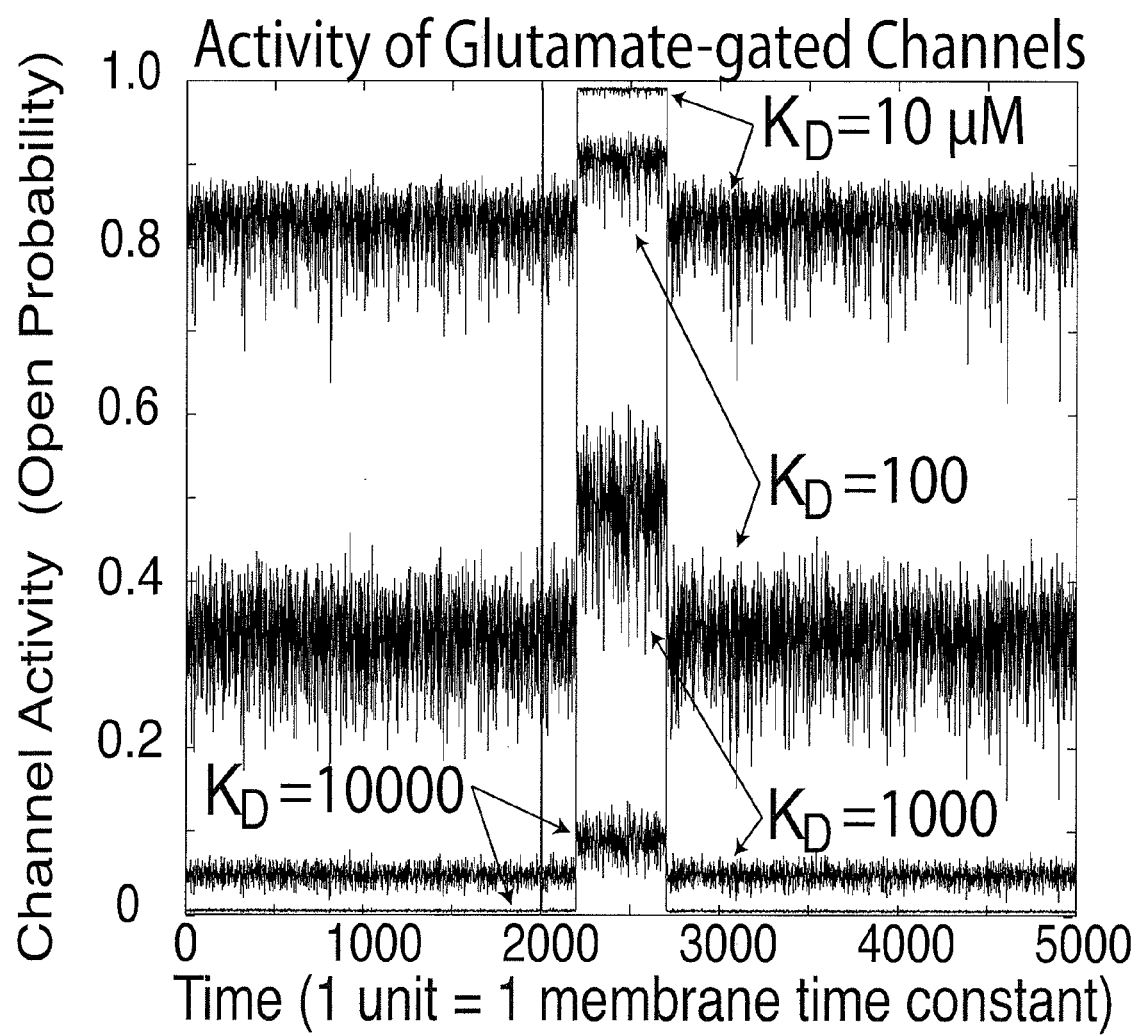
Figure 3D:
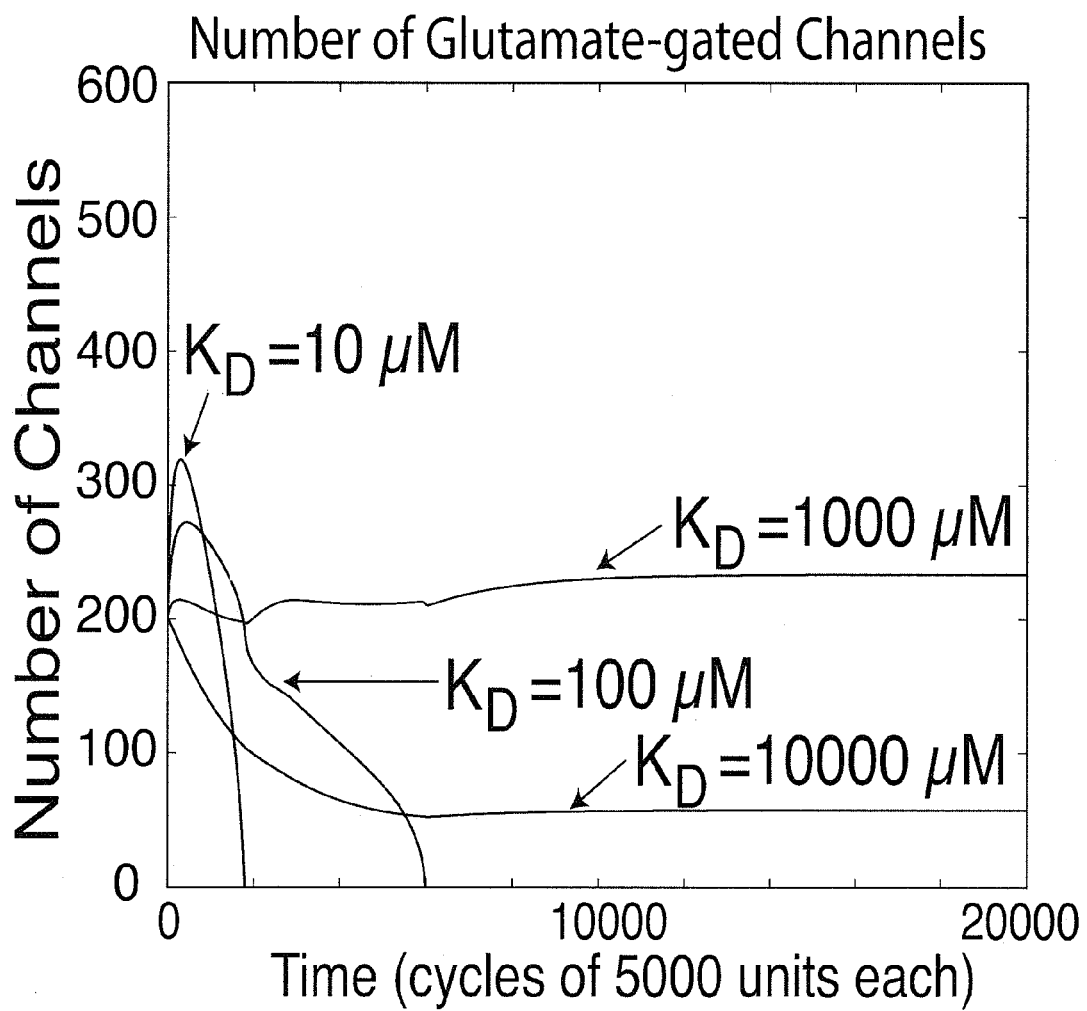
Figure 3E:
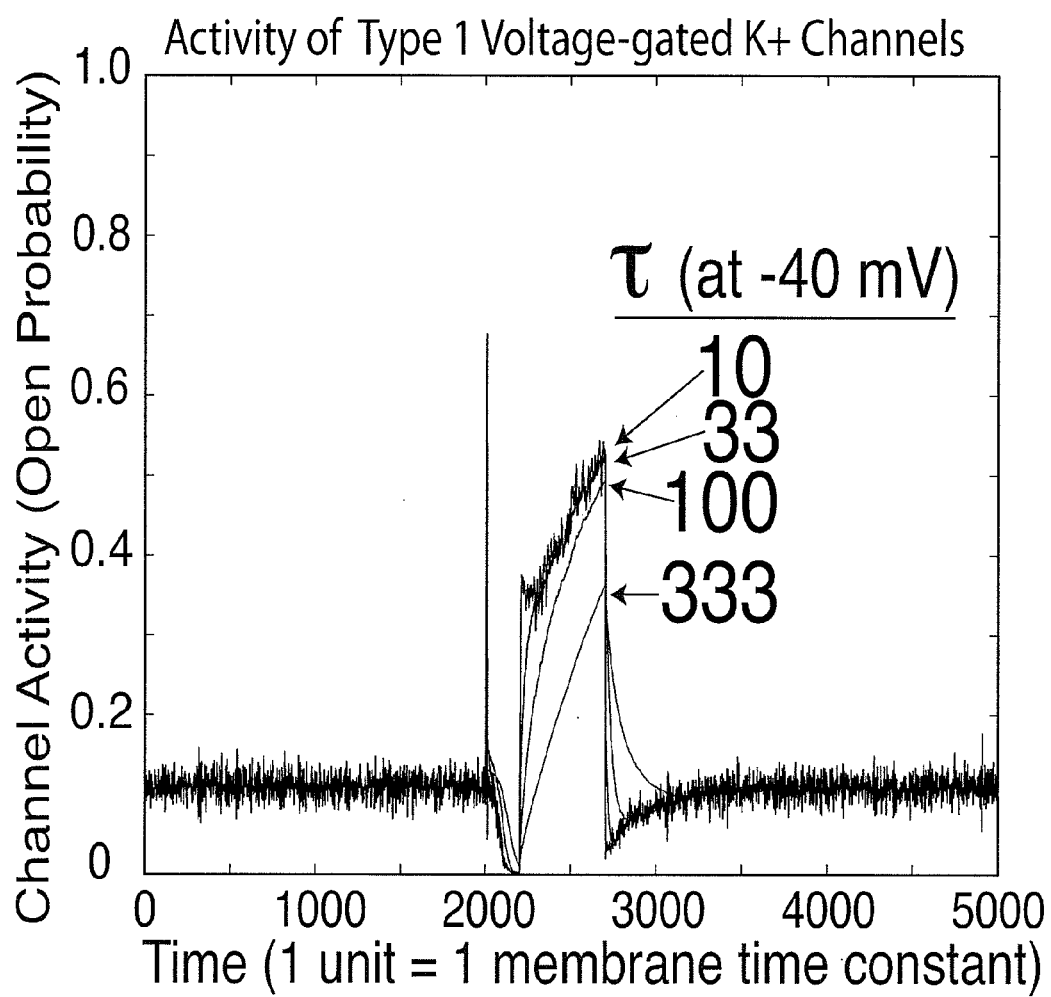

The four types of glutamate-gated channels differed in their affinities ($K_D$) for glutamate. This can be seen in FIG. 3C, which shows the activities (i.e. open probabilities) for each channel type during a single cycle. Subtypes with intermediate affinities were the most sensitive to the actual range of glutamate concentrations to which the neuron was exposed. Their activity was more variable and less predictable, and one of these ($K_D$=1000 µM) was therefore the predominant subtype selected by the Hebbian plasticity rule of Equation 4. FIG. 3D shows the numbers (i.e. weights w in Equation 4) of each type of glutamate-gated channel as a function of cycle number, where the value for each cycle was the average weight over all 5000 time points in the cycle. The Hebbian plasticity rule selected the most advantageous channel types, those that maximized prediction errors or deviations in voltage, and disposed of the others. As learning progressed and higher and lower affinity receptors were eliminated (FIG. 3D), the neuron's membrane potential became more sensitive to glutamate concentration and therefore more variable. This is illustrated in FIG. 3B, in which the bottom trace showing membrane voltage during the last cycle is highly variable in comparison to the top trace showing membrane voltage during the first cycle.

Figure 3F:
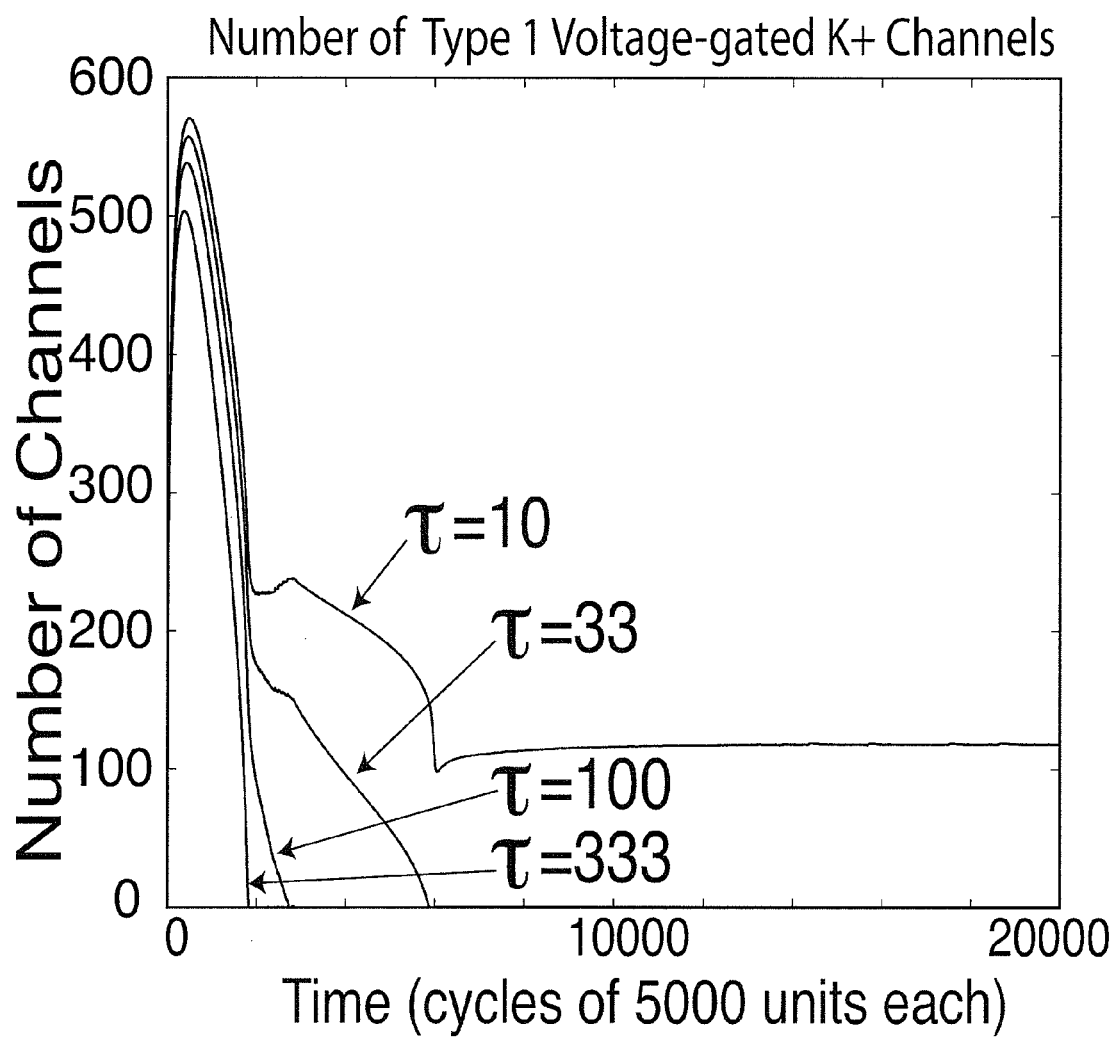
Figure 3G:
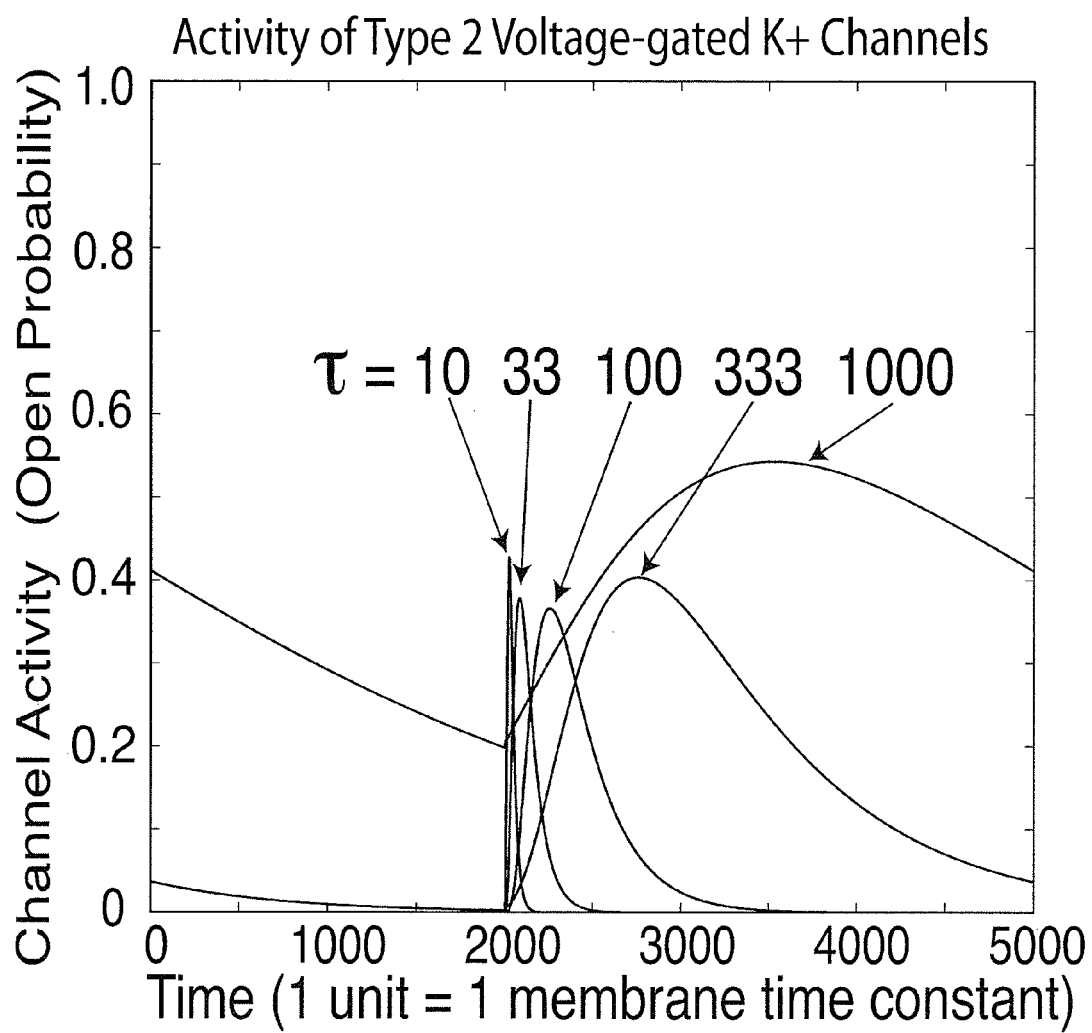

The neuron's prior information (i.e. class 2 inputs) comprised 9 subtypes of potassium channels. Four of these were type 1 and five were type 2 channels. Type 1 channels were gated by a single two-state voltage sensor with a half-maximal activation at −40 mV at equilibrium, and thus their activity at each moment was simply an exponential function of past voltages. The activities of each type of channel are shown in FIG. 3E during the last cycle. The four subtypes differed in their kinetic properties, with time constants $\tau$ at −40 mV ranging from 10 to 333 time units. For approximately the first 1000 cycles, the number of each type of potassium channel increased from its starting value of 89 because the membrane voltage was almost always depolarized beyond $\theta$ (−50 mV) in equation 3. This continued until the total potassium conductance was sufficient to bring the membrane voltage near the null point 0 where the average error was zero. The anti-Hebbian rule of equation 3 ultimately selected the channel type with the fastest kinetics ($\tau=10$ time points), as shown in FIG. 3F. This channel was appropriate in this case because the most recent past was better than the more distant past in predicting membrane voltage, and thus in predicting glutamate concentration as well. This was true both because of the short range correlations in membrane voltage introduced by the membrane time constant, which for simplicity was fixed at one time unit, and because of the step changes in mean glutamate concentration. The channel with the fastest kinetics was able to more rapidly adapt its prediction and thereby minimize the error. Indeed, many real voltage-gated potassium channels have fast kinetics. However, the most recent past is not always the best predictor of the present. Likewise, when glutamate concentration displayed Gaussian variation but lacked other temporal patterns, the anti-Hebbian rule selected the channel type with the slowest kinetics, since that channel made the best predictions by averaging over the longest period of past voltages (not shown).

Figure 3H:
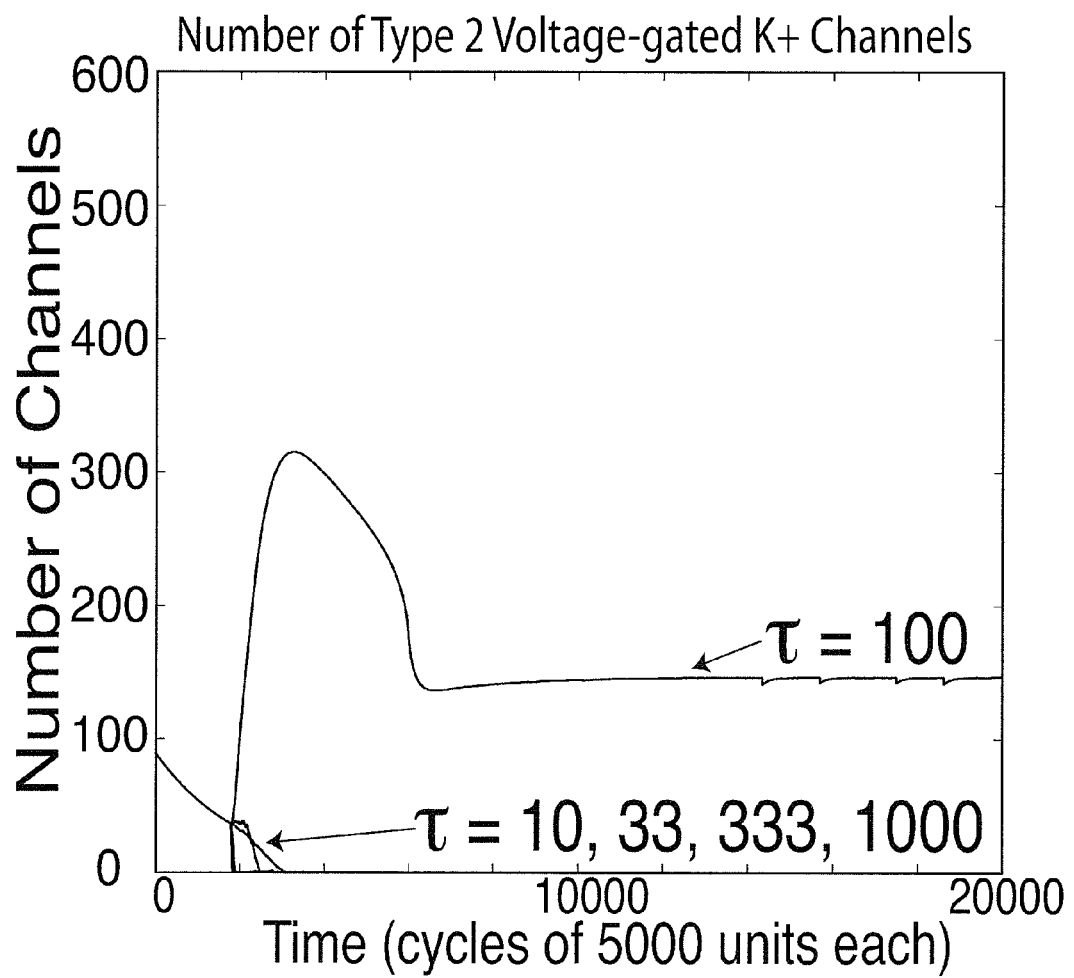

The type 1 potassium channels were not able to predict when the second pulse of glutamate would occur given the first pulse, but in principle, some types of channel could do so. The type 2 potassium channels were designed for this purpose. Each of the five subtypes of type 2 potassium channel were gated by eight sensors, as previously described. The subtypes differed in their kinetic properties as shown in FIG. 3G. The gating of each type 2 channel by multiple sensors made it more like real channels relative to the single-sensor type 1 channels. The rules of channel gating and sensor kinetics were chosen so that a channel opened for a certain time period after membrane voltage was depolarized beyond −25 mV. For nearly the first 2000 cycles, this threshold was never reached, and thus the number of each subtype of type 2 channel declined due to the passive decay term of equation 3 (FIG. 3H). Eventually, as membrane voltage became more sensitive to glutamate concentration due to the selection of more sensitive glutamate-gated ion channels, the first pulse of glutamate became sufficient to depolarize the membrane beyond −25 mV and thereby activate type 2 channels. Thereafter, the anti-Hebbian rule selected the channel subtype with kinetics that roughly matched the actual interval between the two pulses of glutamate ($\tau=100$) (FIG. 3H). This subtype was selected because it counteracted the glutamate-driven depolarization (i.e. positive error), and in spite of the fact that it also caused a brief hyperpolarization (i.e. negative error) prior to the second pulse of glutamate (FIG. 3B, bottom trace). Thus this type of channel could use the first pulse of glutamate to predict and counteract the depolarization caused by the second pulse of glutamate.

The function of a neuron would depend on the information sources (i.e. channel types or synapses) available to it. This example is provided only for illustration and is not meant to limit the sorts of information sources that could be available to a neuron.

Computer Readable Medium

Figure 4:
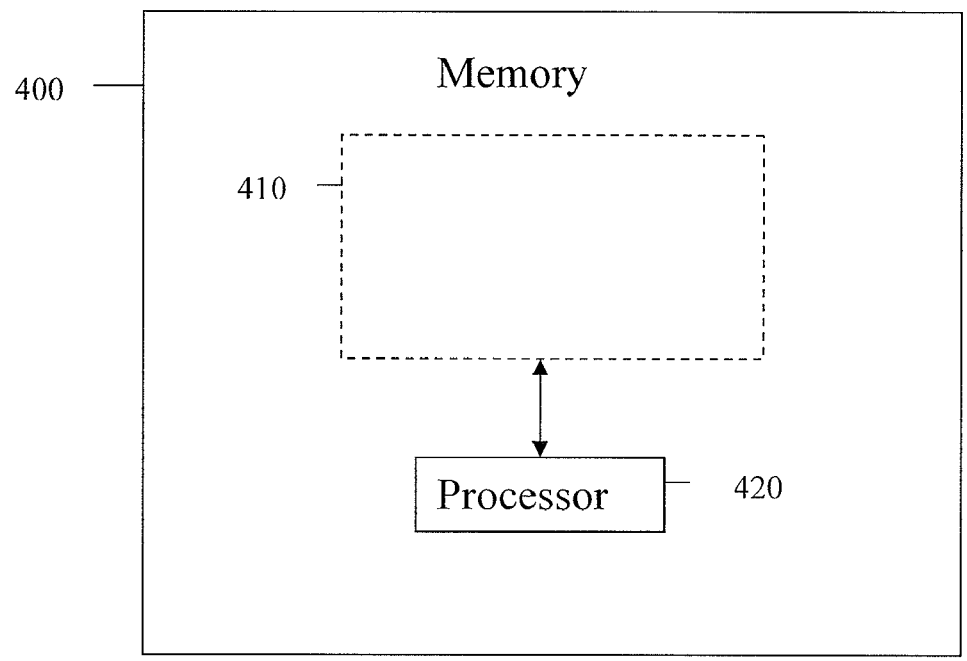
FIG. 4 is a block diagram that illustrates a computer readable medium according to one embodiment of the invention.

In one embodiment, the artificial neurons are generated using a software program stored on a client 400. FIG. 4 is a simplified diagram that illustrates an exemplary architecture for generating a network of artificial neurons. The exemplary architecture is a client 400 (e.g. a computing platform configured to act as a client device such as a computer), a digital media player, a personal digital assistant, or a cellular telephone that is configured to include a computer-readable medium 410, such as random access memory (RAM) or magnetic or optical media, coupled to an electronic processor 420. The processor 420 executes program instructions stored in the computer-readable medium 200.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A method for processing information using at least one artificial neuron, each of said at least one artificial neuron receiving a first and a second class of input, wherein at least one of said first and said second class comprises a plurality of inputs, and for generating an output from each of said at least one artificial neuron, the method comprising for each of said at least one artificial neuron:

providing said first class of input, each input having a weight and an activity;

providing said second class of input, each input having a weight and an activity;

selecting a value for said weight for each input in said first class to maximize a discrepancy corresponding to said output of said artificial neuron, said discrepancy comprising a difference between the weighted sum of activities in the first class of inputs versus the weighted sum of activities in the second class of inputs;

selecting a value for said weight for each input in said second class to minimize said discrepancy corresponding to said output of said artificial neuron; and generating said output corresponding to said discrepancy, said discrepancy being between a weighted sum based on a selected weight values of said first class of input and based on a selected weight values of said second class of input;

wherein said artificial neuron predicts an aspect of the world that is informative to said artificial neuron.

2. The method of claim 1, wherein said selection of weights for said first class of input is guided by a Hebbian-type plasticity rule.

3. The method of claim 1, wherein said selection of weights for said second class of input is guided by an anti-Hebbian-type plasticity rule.

4. The method of claim 1, wherein selection of each said weight in said second class of input is performed using linear mean squared estimation.

5. The method of claim 1, said artificial neuron further comprising a membrane, wherein each of said inputs comprise a distinct set of a plurality of ion channels within said artificial neuron's membrane, each of said weights corresponding to a number of functional ion channels associated with said input, said discrepancy corresponding to a voltage difference across said membrane.

6. The method of claim 1, wherein said weights for said first class of input are selected to maximize a function of said discrepancy and a correlation between a weighted sum of said first class of inputs and a rewarding goal.

7. A computer-readable storage medium containing program code executable by a processor for processing information using at least one artificial neuron, each of said at least one artificial neuron receiving a first and a second class of input, wherein at least one of said first and said second class comprises a plurality of inputs, and for generating an output, the method comprising for each of said at least one artificial neuron:
  program code for providing said first class of input, each input having a weight and an activity;
  program code for providing said second class of input, each input having a weight and an activity;
  program code for selecting a value for said weight for each input in said first class to maximize a discrepancy corresponding to said output of said artificial neuron, said discrepancy comprising a difference between the weighted sum of activities in the first class of inputs versus the weighted sum of activities in the second class of inputs;
  program code for selecting a value for said weight for each input in said second class to minimize said discrepancy corresponding to said output of said artificial neuron artificial neuron; and
  program code for generating said output corresponding to said discrepancy, said discrepancy being between a weighted sum based on selected weight values of said first class of input and based on selected weight values of said second class of input;
  wherein said artificial neuron predicts an aspect of the world that is informative to said at least one artificial neuron.

8. The computer-readable storage medium of claim 7, wherein said selection of weights for said first class of input is guided by a Hebbian-type plasticity rule.

9. The computer-readable storage medium of claim 7, wherein said selection of weights for said second class of input is guided by an anti-Hebbian-type plasticity rule.

10. The computer-readable storage medium of claim 7, wherein selection of each said weight for said second class of input is performed using linear mean squared estimation.

11. The computer-readable storage medium of claim 7, said artificial neuron further comprising a membrane, wherein each of said input comprises a distinct set of a plurality of ion channels within said artificial neuron's membrane, each of said weights corresponding to a number of functional ion channels associated with said input, said discrepancy corresponding to a voltage difference across said membrane.

12. The computer-readable storage medium of claim 7, wherein said weights for said first class of input are selected to maximize a function of said discrepancy and a correlation between a weighted sum of said first class of inputs and a rewarding goal.

13. The computer-readable storage medium of claim 7, wherein activities of said second class of input comprises a plurality of memories of past outputs of said artificial neuron.

14. An apparatus for processing information comprising:
  at least one artificial neuron, each of said at least one artificial neuron configured to receive a first and a second class of input, wherein at least one of said first and said second class comprises a plurality of inputs, and each of said at least one artificial neuron configured to generate an output;
  said artificial neuron providing said first class of input, each input of said first class of input having a weight and an activity;
  said artificial neuron providing said second class of input, each input of said second class of input having a weight and an activity;
  said artificial neuron selecting a value for said weight for each input in said first class to maximize a discrepancy corresponding to said output of said artificial neuron;
  said artificial neuron selecting a value for said weight for each input in said second class to minimize said discrepancy corresponding to said output of said artificial neuron; and
  said artificial neuron generating said output corresponding to said discrepancy, said discrepancy comprising a difference between a weighted sum of activities of said first class of input and a weighted sum of activities in said second class of input;
  wherein said artificial neuron predicts an aspect of the world that is informative to said artificial neuron.

15. The apparatus of claim 14, wherein said selection of weights for said first class of input is guided by a Hebbian-type plasticity rule.

16. The apparatus of claim 14, wherein said selection of weights for said second class of input is guided by an anti-Hebbian-type plasticity rule.

17. The apparatus of claim 14, wherein activities of said second class of input comprises a plurality of memories of past outputs of said at least one artificial neuron.

18. The apparatus of claim 14, said artificial neuron further comprising a membrane, wherein each of said input comprises a distinct set of a plurality of ion channels within said artificial neuron's membrane, each of said weights corresponding to a number of functional ion channels associated with said input, said discrepancy corresponding to a voltage difference across said membrane.

19. The apparatus of claim 14, wherein said weights for said first class of input are selected to maximize a function of said discrepancy and a correlation between a weighted sum of said first class of inputs and a rewarding goal.

* * * * *